(12) United States Patent
Yerkes

(10) Patent No.: US 10,850,385 B2
(45) Date of Patent: Dec. 1, 2020

(54) HUBSTAND

(71) Applicant: Mark Allen Yerkes, Lake Saint Louis, MO (US)

(72) Inventor: Mark Allen Yerkes, Lake Saint Louis, MO (US)

( * ) Notice: Subject to any disclaimer, the term of this patent is extended or adjusted under 35 U.S.C. 154(b) by 0 days.

(21) Appl. No.: 16/267,148

(22) Filed: Feb. 4, 2019

(65) Prior Publication Data

US 2019/0275662 A1    Sep. 12, 2019

Related U.S. Application Data

(60) Provisional application No. 62/639,945, filed on Mar. 7, 2018.

(51) Int. Cl.
*B25H 1/00* (2006.01)
*B60S 9/04* (2006.01)

(52) U.S. Cl.
CPC .............. *B25H 1/0007* (2013.01); *B60S 9/04* (2013.01)

(58) Field of Classification Search
CPC ......... B60R 25/093; B60R 25/09; B60S 9/04; B60P 3/122; B25H 1/0007
USPC ......... 248/351, 352, 354.1; 280/763.1, 765.1
See application file for complete search history.

(56) References Cited

U.S. PATENT DOCUMENTS

| 4,691,935 | A | | 9/1987 | Brandt | |
|---|---|---|---|---|---|
| 4,708,362 | A | * | 11/1987 | Raetz | B60S 9/04 280/763.1 |
| 4,804,070 | A | * | 2/1989 | Bohler | B60R 25/09 188/32 |
| 5,520,034 | A | | 5/1996 | Edmondson | |
| 5,628,602 | A | | 5/1997 | Ohsawa | |
| 6,957,722 | B1 | * | 10/2005 | Baskerville, Sr. | B60T 3/00 188/32 |
| 2004/0035998 | A1 | * | 2/2004 | McCoy | B60R 9/06 248/351 |
| 2006/0081755 | A1 | * | 4/2006 | Thorpe | B60S 9/06 248/354.1 |
| 2011/0162916 | A1 | * | 7/2011 | Saliger | B60T 3/00 188/32 |

* cited by examiner

*Primary Examiner* — Steven M Marsh
(74) *Attorney, Agent, or Firm* — Usha Koshy

(57) ABSTRACT

An anti-theft device for use particularly on large vehicles such as trailers, Recreational Vehicles (RV's), and movable tiny houses that require extended storage when not in use. The main body of the device is comprised of a substantially right angled triangle-shaped structure constructed of a heavy metal plate having a broad middle portion and a pair of identical L-shaped pivotally mounted metal plates forming the feet on either side of the broad middle portion of the device. A pair of reinforcement metal bars are welded to the top and bottom of the main body of the device to provide lateral re-enforcement of the main body to hold the weight of a heavy vehicle in storage. The vehicle is lifted up with a jack, the wheels removed and the device is secured to the axle of the vehicle and effectively holds up the vehicle after the jack is removed.

7 Claims, 7 Drawing Sheets

HUBSTAND

FIELD OF THE INVENTION

The present invention relates generally to anti-theft mechanical devices. More particularly, the invention is directed to an anti-theft device to be used on trailers, tiny houses on wheels, recreational and other vehicles that may require long term storage when not in use.

BACKGROUND OF THE INVENTION

The need for anti-theft devices to prevent vehicle theft has produced a plethora of such devices of various designs and functionality. The majority of vehicle anti-theft devices currently in the market are meant for use with vehicles such as cars, sports vehicles, trucks and motor cycles while they are parked for a short period. A significant number of such vehicle anti-theft devices operate by locking the wheels of the vehicles, thereby incapacitating the movement of the vehicle which deters the stealing of the vehicle.

Trailers, Recreational Vehicles (RV's), and other large bodies such as Tiny Houses which may require long-term storage while not in use are best protected from theft if their wheels are removed during storage to extend the lifespan of the wheels. Once the wheels are removed, these vehicles require a source of support to hold them up above ground, and various means to hold the body of the vehicles up are known to be used by those skilled in the art. However, prior art does not provide too many examples of the means used for holding up the body of the trailer, RV and/or Tiny house as also functioning as an anti-theft device. U.S. Pat. No. 4,691,935 describes an anti-theft trailer assembly that includes a trailer body, a cab connector in the form of a hitch post depending from the front portion of the trailer and having a generally central annular recess therein, and a lock releasably secured in the annular recess. The lock of this device has a lock body with two generally U-shaped halves, each with a pair of spaced arms, one set having depending posts releasably secured to the other set of arms. The lock halves define a central transverse opening which receives the recessed portion of the hitch post, rendering it unusable by filling it and slightly bulging from it.

The present invention is an anti-theft device with a unique design and functionality to overcome the deficiencies in the prior art for anti-theft devices for use with large vehicles such as trailers, recreational Vehicles (RV's) and other large movable structures such as tiny houses when they require storage for a long period of time when not in use.

SUMMARY OF THE INVENTION

The present invention is an anti-theft device for use on a vehicle, more particularly on large vehicles such as trailers and Recreational Vehicles (RV's) and even tiny houses that require extended storage when not in use.

It is an object of the anti-theft device of the present invention to provide a device that is capable of bearing the weight of a trailer, large vehicles such as RV's, and tiny houses when the device is installed under these heavy structures.

It is another object of the anti-theft device of the present invention to increase the stability of the large, heavy vehicles while they are in storage for an extended period by spreading the load of the vehicles over a broad area of the anti-theft device of the invention thereby preventing the vehicles from rolling out of their storage area.

It is yet another object of the anti-theft device of the present invention to decrease the likelihood of theft of the vehicles by allowing the tires to be removed while the vehicle is held up by the device.

It is a further object of the anti-theft device of the present invention to make it possible to increase the lifespan of the tires on a vehicle by having them removed from the vehicle and stored separately.

An exemplary embodiment of the anti-theft device of the present invention is comprised of a substantially right angled triangle-shaped main body constructed of heavy metal having a broad middle portion at the top end, progressively narrowing and tapering to form a pair of feet at the distal ends on either side of the broad middle portion of the device.

In the exemplary embodiment of the anti-theft device of the invention, the broad middle portion of the device is configured with a nut and bolt arrangement that is used to secure the device to the axle of a vehicle after the vehicle is suspended upward with a jack device.

In the exemplary embodiment of the anti-theft device of the invention, a pair of reinforcement metal bars are welded to the top and bottom of the main body of the device to provide lateral re-enforcement of the main body to hold the weight of a heavy vehicle.

In the exemplary embodiment of the anti-theft device of the invention, once the body of the trailer, RV, or tiny house is lifted up by a jack device and the anti-theft device of the invention is secured to the axle of the vehicle, the weight of the vehicle is effectively held up by the body and feet of the anti-theft device.

The objects, embodiments and other features of the anti-theft device of the present invention disclosed in this summary of the invention will become more obvious to one skilled in the art when viewed in conjunction with the drawings and detailed description of the device accompanied by the appended claims.

DETAILED DESCRIPTION OF THE INVENTION

The present invention provides an anti-theft device that is capable of holding up the body of a trailer and/or other large vehicle and even a transportable tiny house on wheels while they are in storage with their wheels removed.

Figure 1:
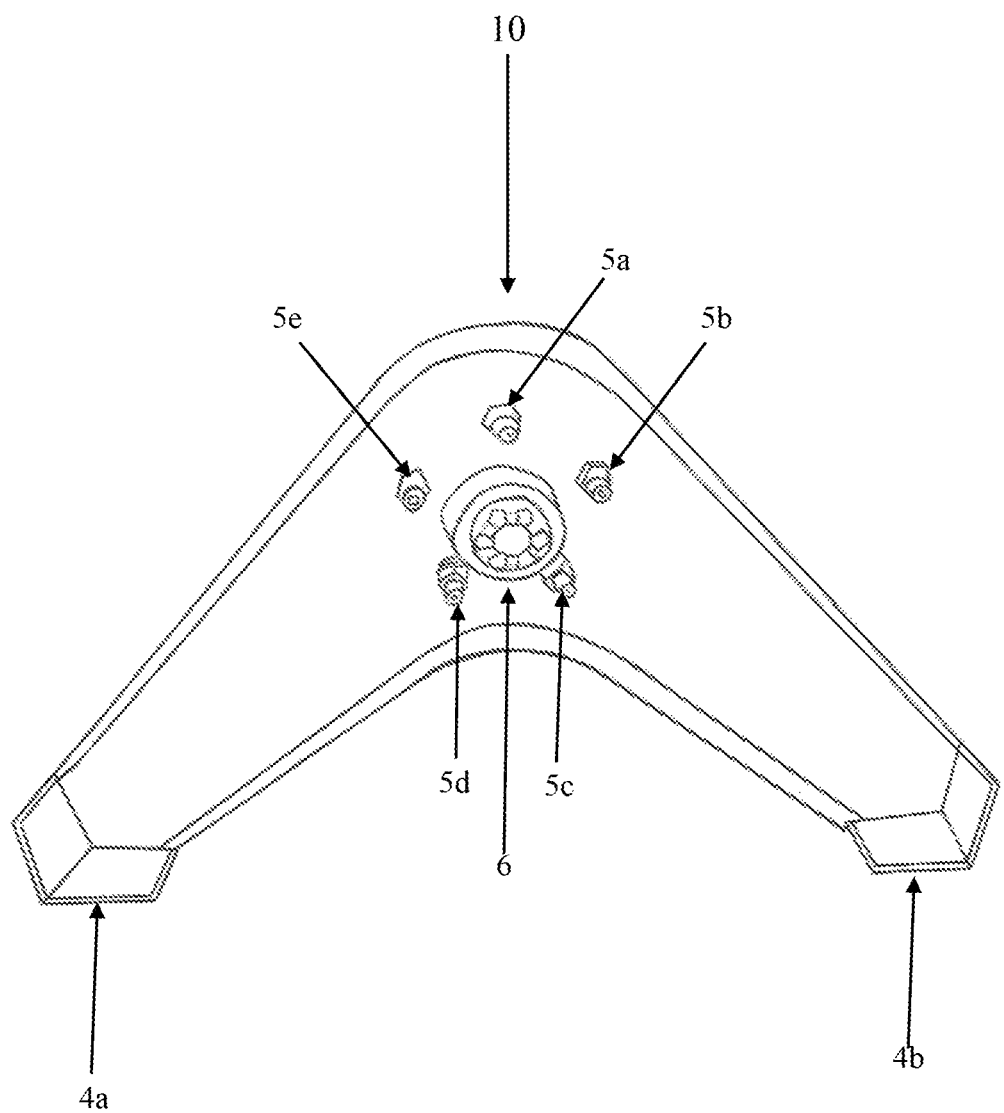
FIG. 1 is a perspective view of the anti-theft device of the present invention.

Referring now to the figures wherein like numerals represent like components in the several views presented and discussed, and more particularly referring now to FIG. 1 the figure, is a perspective view of the anti-theft device 10 of the present invention. The main body of the device is comprised of a substantially right angled triangle-shaped structure constructed of a heavy metal plate having a broad middle portion 1 at the top end, progressively narrowing and tapering to form a pair of identical L-shaped pivotally mounted metal plates forming the feet 4a and 4b at the distal ends on either side of the broad middle portion 1 of the device. In this embodiment of the anti-theft device 10 of the invention, the L-shaped plates on the feet 4a and 4b are welded perpendicular to the main body of the device and allow the load of a large vehicle, or structure to be spread laterally in conjunction with the main body of the device. In the exemplary embodiment of the anti-theft device 10 of the invention, the bottom end of the feet 4a and 4b have rubber padding to allow for increased grip on paved surfaces.

Referring again to FIG. 1 the broad middle portion of the anti-theft device 10 is configured with a nut and bolt arrangement that is used to secure the device to the axle of a vehicle after the vehicle is suspended upward with a jack device. The nut and bolt arrangement at the center of the broad middle portion of the device is comprised of a large nut and bolt structure 6 and a set of smaller nut and bolt structures 5a, 5b, 5c, 5d and 5e positioned around the center nut and bolt structure 6 to provide additional reinforcement to secure the anti-theft device 10 to the axle of the vehicle.

Figure 2:
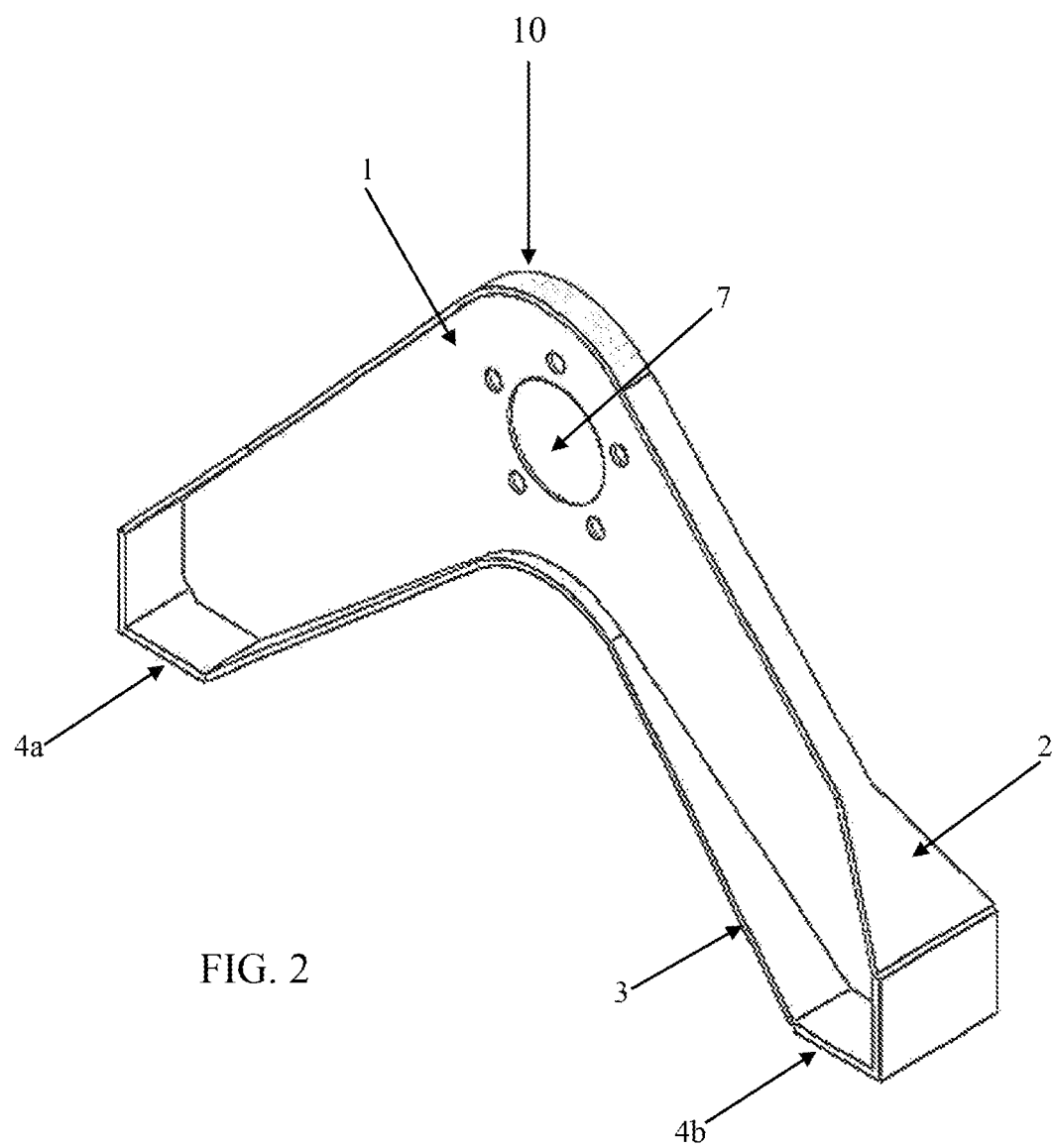
FIG. 2 is another perspective view of the anti-theft device of the present invention with a clearer view of the pair of reinforcement metal bars that are welded across the center of the top and bottom of the main body of the device.

Referring now to FIG. 2 which shows another perspective view of the anti-theft device 10. A pair of reinforcement bars 2 and 3 are welded across the center of the top and bottom surfaces of the main body of the device 10 to provide lateral reinforcement of the main body to hold the weight of a heavy structure such as a trailer, RV, or tiny house. The reinforcement bars 2 and 3 have an "I-beam" like construction which dramatically increases the load capacity of the main body. This view also shows the orifice 7 that holds the larger nut and bolt arrangement 6 shown and described in FIG. 1

Figure 3:
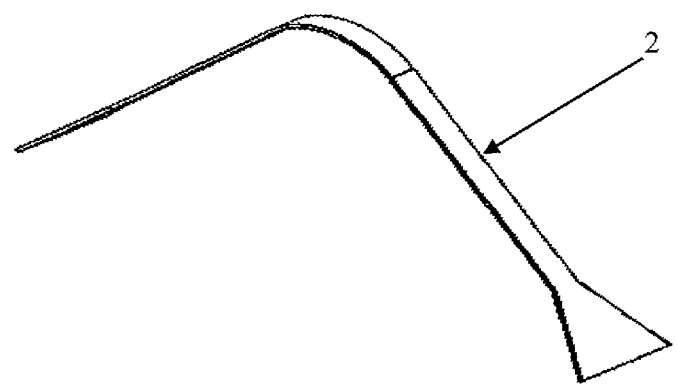
FIG. 3 is a perspective view of the top reinforcement bar of the anti-theft device of the invention.
Figure 4:
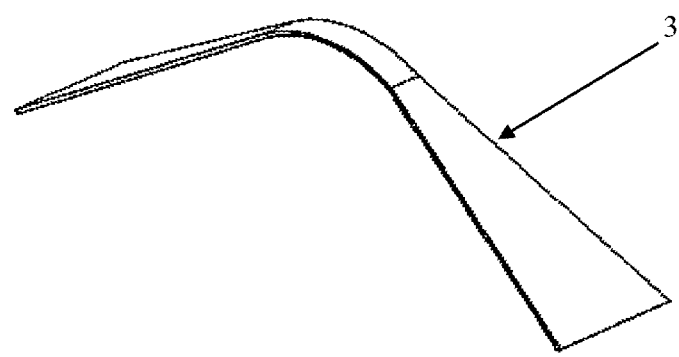
FIG. 4 is a perspective view of the bottom reinforcement bar of the anti-theft device of the invention.

FIG. 3 shows a perspective view of the top reinforcement metal bar 2 and FIG. 4 shows a perspective view of the bottom reinforcement metal bar 3. These metal bars have an I-beam-like construction which dramatically increases the load capacity of the main body of the antitheft device of the invention. The tension of the reinforcement bars 2 and 3 hold the feet of the device securely to the ground. As the ground compacts or shifts under the weight of a tiny house, RV or, trailer and its occupants if any, the tension created by the reinforcement bars 2 and 3 draw the feet of the device together and automatically adjust the feet so that constant contact is made with the ground to effectively hold up the heavy structures.

Figure 5:
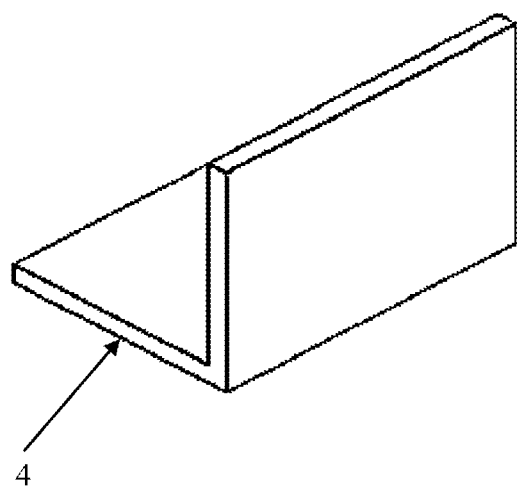
FIG. 5 is a perspective view of the L-shaped plate forming the feet of the anti-theft device of the invention.

FIG. 5 is a perspective view of the L-shaped plate forming the feet 4 of the anti-theft device of the invention.

Figure 6:
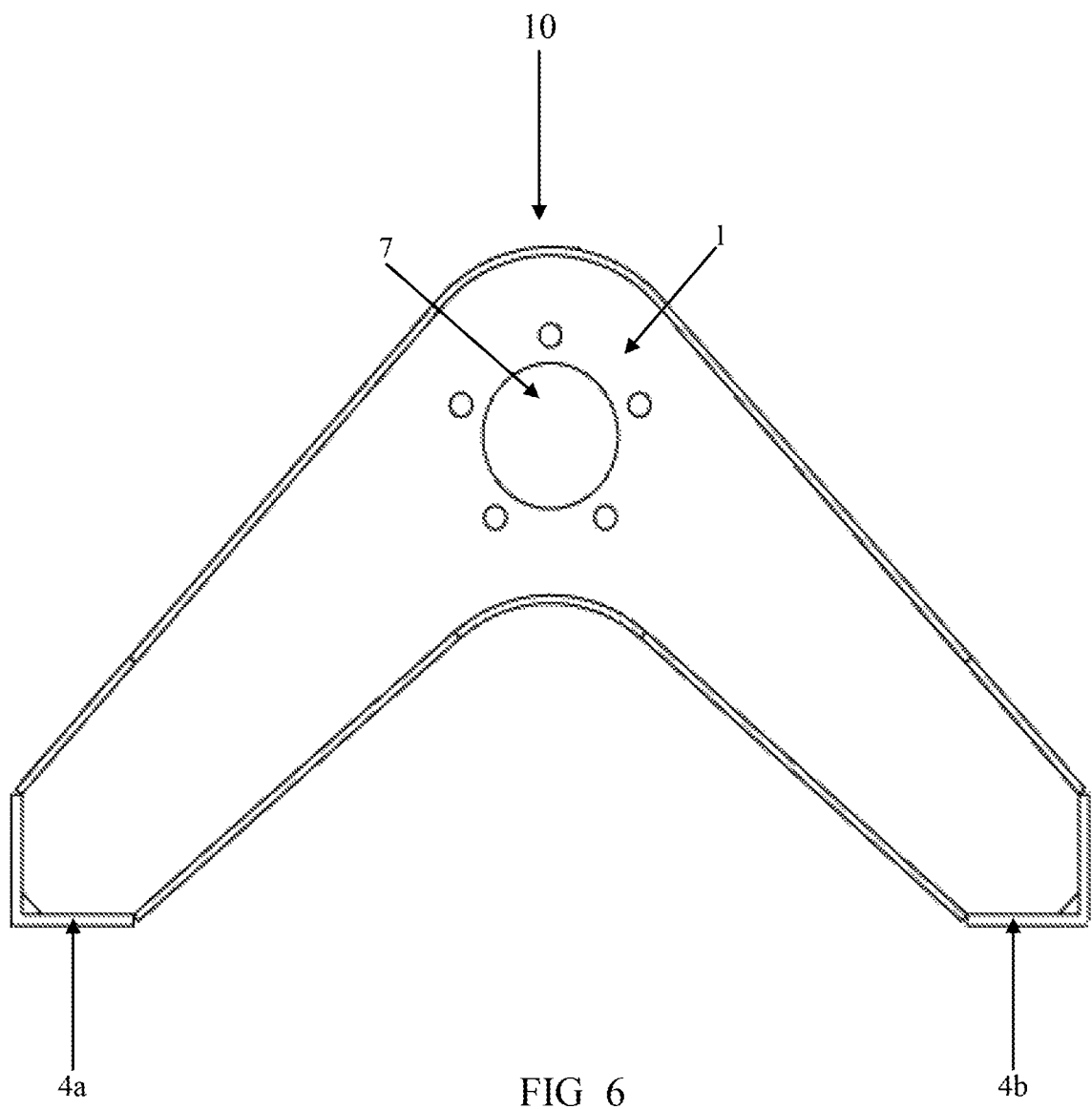
FIG. 6 is a cross sectional view of the anti-theft device of the present invention.

FIG. 6 illustrates a cross sectional view of the anti-theft device 10 of the present invention showing a view of the main body with the broad middle portion 1, the feet, 4a and 4b on either side of the main body 1 and the orifice 7 that is the receptacle for the large bolt and nut arrangement that facilitates the securement of the anti-theft device 10 to the axle of a trailer, RV, or tiny house. The underside of the feet are equipped with rubber pads for increased grip on paved surfaces.

Figure 7:
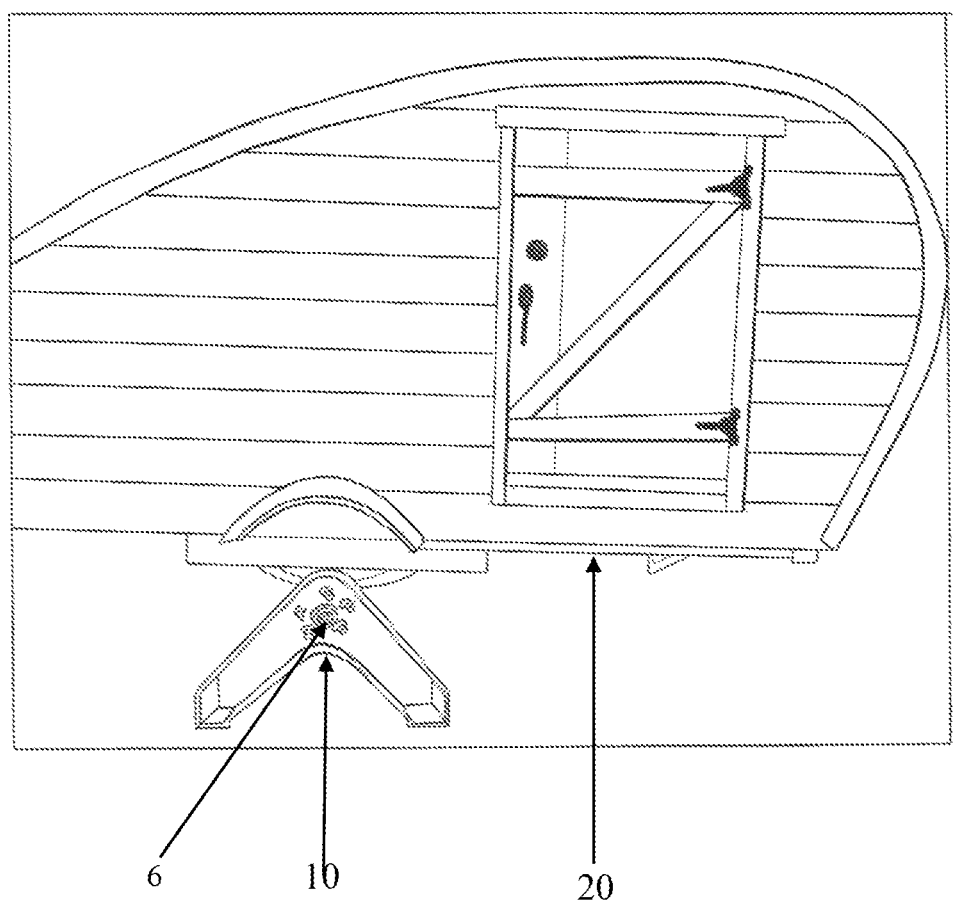
FIG. 7 is a perspective view of the anti-theft device of the invention installed on a trailer.

FIG. 7 is a perspective view of the anti-theft device 10 of the invention installed at the bottom end of a trailer 20. The large nut and bolt arrangement 6 combined with the smaller set of nuts and bolt surrounding the large bolt arrangement 6 are used to secure the anti-theft device 10 to the axle of the trailer.

Figure 8:
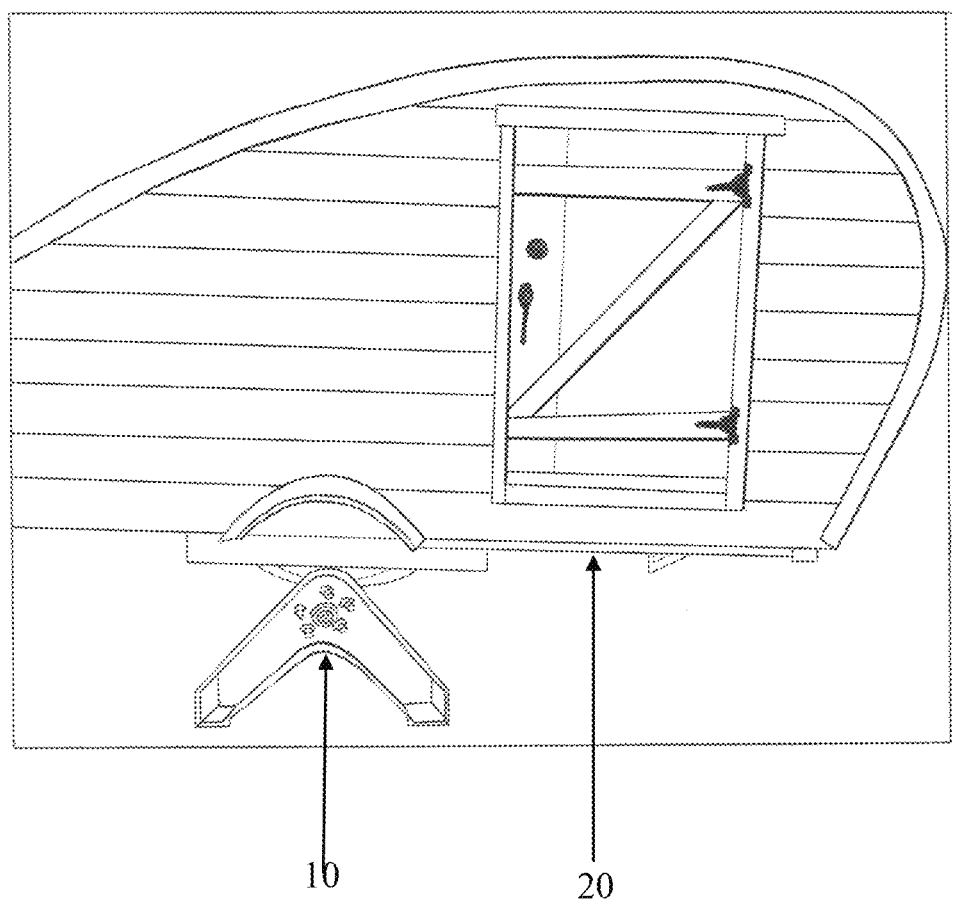
FIG. 8 is another perspective view of the anti-theft device of the invention installed on a trailer.

FIG. 8 is another perspective view of the anti-theft device 10 of the invention installed at the bottom end of a trailer 20. In operation, the user loosens the lug nuts on the trailer, RV, or tiny house, lifts up the structure using a jack, removes the wheel assembly and tires, and using the bolt and nut arrangement bolts in the anti-theft device 10 to the axle of the trailer, RV, or tiny house. Once the anti-theft device 10 is secured to the trailer axle as seen in this figure, the jack is removed allowing the weight of the trailer to bear on the anti-theft device 10.

While the present invention has thus been described through its preferred embodiments and related figures, it is to be understood that the embodiments of the present invention as described herein do not limit any application or scope of the invention and that the invention can be carried out and practiced in various ways and implemented in embodiments other than the ones outlined and described above. It should be understood and obvious to one skilled in the art that alternatives, modifications, and variations of the embodiments of the present invention may be construed as being within the spirit and scope of the appended claims.

What is claimed is:

1. An anti-theft device comprising:
    a substantially right angled triangle-shaped main body structure having a broad middle portion at a top end of said structure, progressively narrowing and tapering to form a pair of feet structures on either side of said broad middle portion of said main body structure, at a distal end of said main body structure;
    said pair of feet structures formed of identical L-shaped pivotally mounted metal plates perpendicular to said main body structure of said anti-theft device;
    said main body structure of said anti-theft device having a pair of reinforcement bars across a center of a top and a bottom surface of said main body structure of said anti-theft device; and
    said broad middle portion of said main body structure of said anti-theft device comprising a nut and bolt arrangement at a center of said broad middle portion of said main body structure, and a plurality of smaller nut and bolt structures positioned around said center nut and bolt arrangement to provide additional reinforcement to secure said anti-theft device to an axle of a vehicle, a trailer, Recreational Vehicle (RV), or tiny house.

2. The anti-theft device as in claim 1 wherein the L shaped metal plates of the feet of the anti-theft device allow a heavy load to be spread laterally in conjunction with the main body of the antitheft device.

3. The anti-theft device as in claim 1 wherein the reinforcement bars have an I-beam-like construction which increases the load capacity of the main body structure of the antitheft device to provide lateral reinforcement of the main body structure to hold the weight of a heavy structure the trailer, RV or tiny house.

4. The anti-theft device as in claim 1 wherein non-slip rubber pads are provided under the feet to allow for increased grip on paved surfaces.

5. The anti-theft device as in claim 1 wherein as a ground compacts or shifts under a weight of a heavy structure the trailer, RV or tiny house and its occupants, a tension of the reinforcement bars holds the feet of the anti-theft device securely against the ground and draws the feet together, automatically adjusting the feet so that constant contact is made with the ground to hold up the heavy structures.

6. The anti-theft device as in claim 1 wherein the trailer, RV or tiny house are lifted up by a jack device and a plurality of wheel assemblies and tires of said trailer, RV or tiny house are removed, and the anti-theft device is secured to the axle of the trailer, RV or tiny house using the nut and bolt arrangements on the anti-theft device, and the weight of the trailer, RV or tiny house is held up by the main body structure and feet of the anti-theft device.

7. The anti-theft device as in claim 6 wherein removing the tires of the trailer, RV or tiny house before installing the anti-theft device allows the tires to be stored separately, increasing a lifespan of the tires.

\* \* \* \* \*